United States Patent [19]

Shimazu et al.

[11] Patent Number: 4,867,542
[45] Date of Patent: Sep. 19, 1989

[54] LASER EXPOSURE APPARATUS

[75] Inventors: Shigeaki Shimazu; Kenji Endo; Eiichi Tamaki, all of Kyoto; Yasuyuki Wada, Osaka; Masahide Okazaki, Kyoto; Takeshi Kageyama, Kyoto; Yoshio Kurata, Kyoto, all of Japan

[73] Assignee: Dainippon Screen Mfg. Co., Ltd., Japan

[21] Appl. No.: 227,738

[22] Filed: Aug. 3, 1988

Related U.S. Application Data

[62] Division of Ser. No. 33,582, Apr. 1, 1987, Pat. No. 4,810,068.

[30] Foreign Application Priority Data

Apr. 2, 1986 [JP] Japan .................................. 61-76157
Dec. 18, 1987 [JP] Japan .................................. 61-303539

[51] Int. Cl.$^4$ .......................... G02F 1/11; G02F 1/03; G11B 7/00
[52] U.S. Cl. .................................... 350/358; 350/356; 369/44
[58] Field of Search ................... 372/11, 14; 350/314, 350/348, 355, 356, 358; 369/44-46

[56] References Cited

U.S. PATENT DOCUMENTS

| | | | |
|---|---|---|---|
| 3,195,405 | 7/1965 | Clark et al. | 350/314 |
| 4,093,964 | 6/1978 | Aughton | 350/174 X |
| 4,413,270 | 11/1983 | Sprague | 350/356 X |
| 4,459,690 | 7/1984 | Corsover | 369/44 |

Primary Examiner—Eugene R. LaRoche
Assistant Examiner—Nathan W. McCutcheon
Attorney, Agent, or Firm—Osterlenk, Faber, Gerb & Soffen

[57] ABSTRACT

A laser exposure system for use in scanning and recording images, the system comprising subdividing the laser beam from the laser source into several parallel traces of laser beams; modulating the laser beams individually in response to the image signals be means of a multi-channel optical modulator; directing the modulated laser beams through a first mirror and a second mirror so as to enable the laser beams from the second mirror to be in parallel with the reference plane with respect to the sub-scanning direction; varying the distance between the modulator and the first mirror; and adjusting the angles of the first and second mirrors to the reference plane so that a possible decline of the laser beams in the sub-scanning direction is compensated.

4 Claims, 7 Drawing Sheets

LASER EXPOSURE APPARATUS

This is a division of application Ser. No. 33,582, filed Apr. 1, 1987 now U.S. Pat. No. 4,810,068.

BACKGROUND OF THE INVENTION

1. Field of the Invention

The present invention relates generally to a laser exposure system for scanning and recording images, and more particularly to a laser exposure apparatus for scanning and recording images by the use of optically modulated laser beams.

2. Description of the Prior Art

Figure 12:
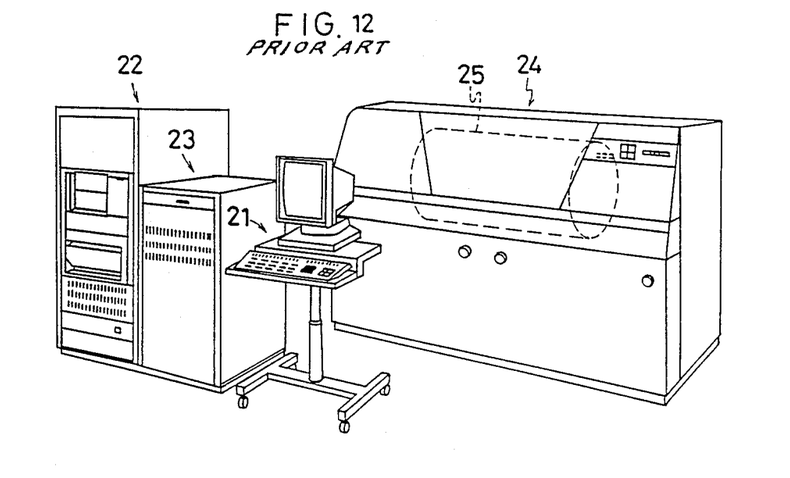
FIG. 12 is a schematic view of a known laser plotter system.

It is known in the art to record images by the use of optically modulated laser beams, a laser plotter and color scanner. The laser plotter shown in FIG. 12 is especially well known and widely used. This plotter includes a console 21, a data processor 23 which processes the data input by the console 21 and magnetic tape, a converter 22 for converting the processed data into signals, and a recorder 24 for scanning and recording the images on a photo-sensitive sheet running on a cylinder 25 in response to the signals transmitted from the converter 22. Laser plotters of this kind can record master patterns, such as printed circuit boards, at high speed and high precision.

Figure 13:
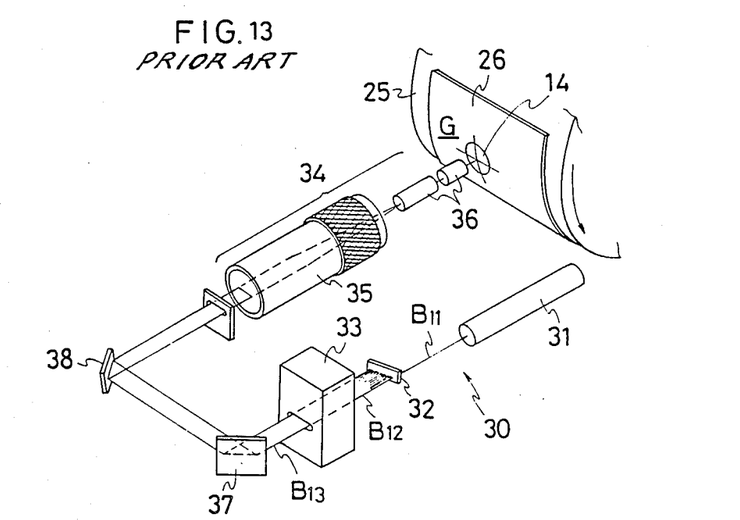
FIG. 13 is a perspective view of a known laser exposure device.

The recorder 24 is normally provided with a laser exposure device 30 shown in FIG. 13 so as to facilitate the recording of desired patterns. One example of such a plotter is disclosed in Japan Patent Publication (unexamined) No. 60-169820 by this inventor. According to this prior art a laser beam $B_{11}$, emitted from a laser source 31, is split into parallel beams $B_{12}$ by means of splitter 32, which beams are individually modulated by a multi-channel modulator to become modulated laser beams $B_{13}$. The modulated laser beams $B_{13}$ are directed to an optical system 34 including a zoom lens 35 and an image-forming lens 36 by a first mirror 37 and a second mirror 38 so as to reduce the beam pitches as desired and form a image 14 on the screen (G).

In the known laser exposure device 30, the laser beams $B_{13}$ modulated by the multi-channel optical modulator 33 unavoidably have a diffraction angle $2\theta$, that is, two times as large an angle as the Bragg angle $\theta$ of the modulator 33. For this reason the first mirror 37 (FIG. 7) and the second mirror 38 are positioned in the direction of diffraction of the laser beams $B_4$ so that the laser beams $B_4$ reflecting off of the second mirror 38 may be parallel to the reference plane (S) which is flush with the foundation plane of the laser exposure device with respect to the sub-scanning direction. The first and second mirrors 37 and 38 are positioned in such a manner that the angle of incline of the laser beams $B_4$ impringing on the first mirror 37 and the angle of incline of the laser beams $B_4''$ reflected off of the second mirror 38 are complementary for the angle of decline of the laser beam $B_4'$ between the first and second mirrors 37, 38. In other words, the angle of propagation of the laser beam is compensated for by an amount $\theta$ with respect to the reference plane (S) each time the laser beam reflects off a consecutive mirrors 37, 38. FIG. 8 shows the paths taken by the laser beams when the Bragg angle of the modulator is $\theta$.

Figure 11:
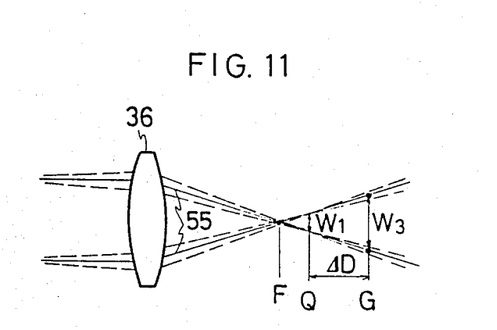
FIG. 11 is a diagrammatic plane view showing the mode of laser beams in the neighborhood of the image forming screen in the optical system.

The known laser exposure device 30 described above is advantageous in that the laser exposure is effected by adjusting the pitch of the beams forming images in optical dots on the screen (G); nevertheless, the following disadvantages result:

1. When a desired image is formed by reducing the pitches of the beams utilizing the image-forming optical system 34, the main path 55 (FIG. 11) of each laser beam is focused through the lens 36 so as to determine the width ($W_1$) of the desired image at the image-forming position (Q). This is likely to cause a deviation $\Delta D$ between the position (Q) and the recording position (G), thereby varying the width ($W_3$) of the image depicted by the optical dots in a stepless manner formed by the laser beams.

When a zoom lens is used to adjust the pitch of the beams in a stepless manner, difficulties are likely to arise when photosensitive sheets 26 of different thicknesses are used, because they vary the deviations $\Delta D$.

Figure 9:
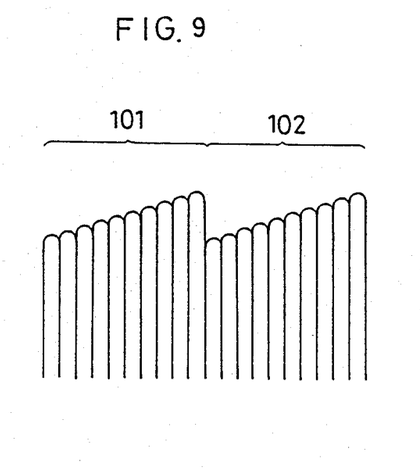
FIGS. 9 and 10 are diagrammatic views showing the images appearing on the photosensitive sheet.
Figure 10:
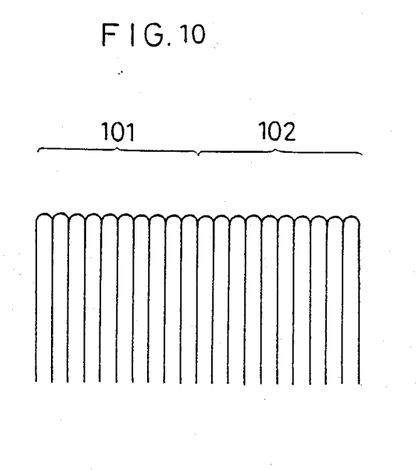

2. As a practical matter it is difficult to ensure that all the multi-channel optical modulators used have an equal Bragg angle, thereby causing the laser beams $B''$ reflecting off of the second mirror to be inclined with respect to the reference plane in the sub-scanning direction. FIGS. 9 and 10 show images fixed on the photosensitive sheets 26 through laser exposure, each being from the same main scanning position. FIG. 10 shows those obtained when the laser beam $B_4''$ are parallel to the reference plane (S), in which it will be appreciated that at the first fixed images 101 and the second fixed images 102 are exactly aligned. In contrast, when the laser beams $B_4''$ are not parallel to each other the images 101 and 102 are misaligned as shown in FIG. 9. This results in poor image quality.

The Bragg angle of a multi-channel optical modulator is normally a very small angle, such as a few milliradians in order, and a possible error is so small (for example one-tenth or far less of a radian thereof) that an incline of laser beams due to such small error in the Bragg angle is usually ignored. However when a high degree of accuracy is required even such a small error cannot be neglected.

OBJECTS AND SUMMARY OF THE INVENTION

A primary object of present invention is to solve the problems pointed out with respect to the known laser exposure devices; that is to provide a laser exposure system which ensures a constant beam pitch regardless of any variations in the distance between the image-forming plane of the optical system and the recording plane.

Another object of the present invention is to provide a laser exposure system for securing a good quality image by compensating for possible errors in the Bragg angle in each multi-channel optical modulator.

Other objects and advantages of the present invention will become more apparent from the following detailed description, when taken in conjunction with the accompanying drawings which show, for the purpose of illustration only, embodiments in accordance with the present invention.

According to the present invention there is provided a laser exposure system for use in scanning and recording images, the system comprising:

subdividing the laser beam from the laser source into several parallel laser beams;

modulating the laser beams individually in response to image signals by means of a multi-channel optical modulator;

directing the modulated laser beams via a first mirror and a second mirror so as to enable the laser beams from the second mirror to be in parallel with the reference plane with respect to the sub-scanning direction; and varying the distance between the modulator and the first mirror; and adjusting the angles of the first and second mirrors to the reference plane so that a possible decline of the laser beams in the sub-scanning direction is compensated.

DETAILED DESCRIPTION OF THE INVENTION

Referring to FIG. 1(A) a laser exposure apparatus according to one embodiment of the present invention includes laser source 1, a beam expander 3, a beam splitter 4, a beam-shaping plate 5, an aperture 6, a multi-channel optical modulator 7, a plate 8 having a slit for diffraction, reflecting mirrors 9a and 9b, and an image-forming optical system 10.

The beam expander 3 includes a pair of lenses 3a, 3b, which expand the diameter of the laser beams $B_1$ emitted from the source 1.

The beam-shaping plate 5 passes a central portion of the laser beam $B_2$ expanded by the expander 3 so as to obtain a relatively constant distribution of optical intensity. In lieu of the beam-shaping plate 5 the beam-shaping plate 5b shown in FIG. 1(B) can be used. This beam-shaping plate 5b is placed between the beam splitter 4 and the optical modulator 7 and has several apertures 6b which correspond to the parallel beams $B_3$ produced by the beam splitter 4. The beam-shaping plates 5b shapes the laser beams before they enter the modulator 7 so as to pass that part of laser beams whichahs a relatively constant optical intensity.

The beam splitter 4 splits the expanded laser beams $B_2$ into several parallel beams $B_3$. Splitter 4 can be provided with a glass plate having parallel surfaces, one of the surfaces having a perfect reflecting coating and the other having a coating which progressively changes the permeability so as to produce parrallel beams $B_3$ having equal quantity of light. Such a beam splitter is disclosed in Japanese Patent Publication No. 52-122135.

The multi-channel optical modulator 7 can be an acousto-optical type, which comprises a plurality of supersonic wave vibrators attached to a single acousto-optical medium. The parallel laser beams $B_3$ are caused to impinge on the medium at places corresponding to the respective vibrators, thereby modulating the laser beams $B_3$ individually.

Figure 4:
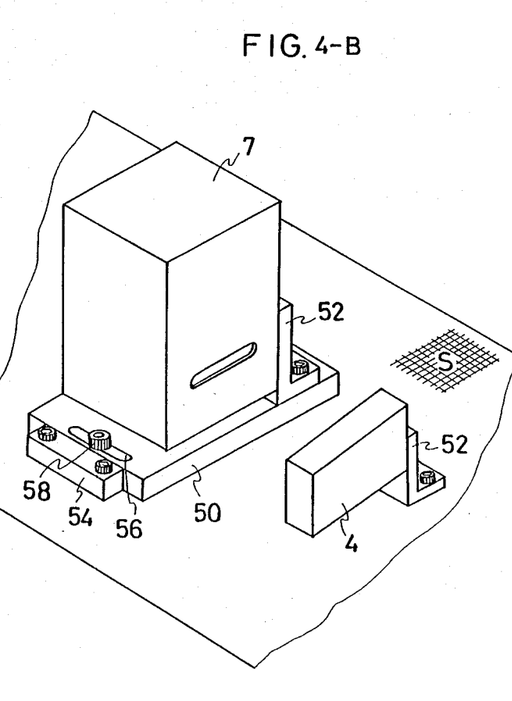
FIG. 4(A) is a perspective view on an enlarged scale showing part of the system shown in FIG. 1(A)
FIG. 4(B) is a perspective view showing a modified version of the device shown in FIG. 4(A)

As shown in FIG. 4(A) the beam splitter 4 and multi-channel optical modulator 7 are fixed to a base plate 50 placed on a reference plane (S) by means of a fastener 52. The base plate 50 is guided by an adjustable guide 54 in such a manner that it can move in a direction parallel to the laser beams $B_3$. The base plate 50 is provided with elongated openings 56 in which screws 58 are fitted. Normally the base plate 50 is fixed on the reference plane (S), and for adjustment they are loosened so as to enable the beam plate to move in a direction parallel to the laser beams. FIG. 4(B) shows another version, in which the beam splitter 4 is permanently fixed on the reference plane (S), and the multi-channel optical modulator 7 alone is moved for adjustment in a direction parallel to the laser beams $B_3$.

Figure 1:
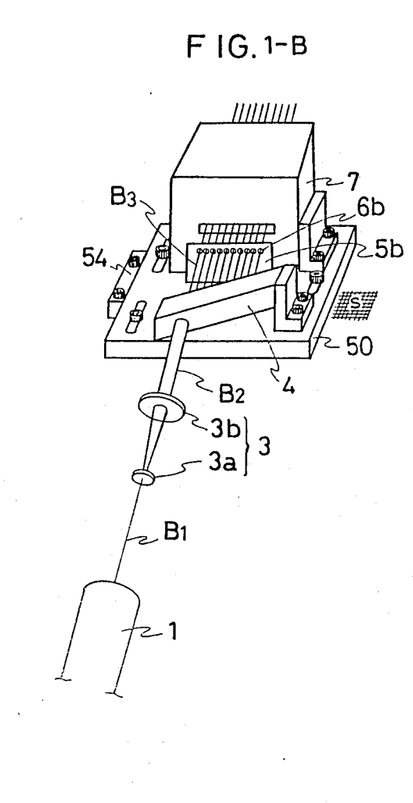
FIG. 1(A) is a diagrammatic perspective view showing a laser exposure system embodying the present invention.
FIG. 1(B) is a perspective view showing a modified version of the system of FIG. 1(A)

Returning to FIG. 1-A, the slit 8 allows the laser beams modulated by the modulator 7 to pass but prevents those beams which have not been modulated from passing.

The directions of the laser beams $B_4$ passing through the slit 8 are changed by the first and second mirrors 9a and 9b, so as to be introduced into the image-forming optical system 10.

The image-forming optical system 10 is a telecentric optical entity which includes two telescopic optical units 11 and 12 telecentrically connected to each other. In this telecentric entity the pitches of a plurality of parallel laser beams are reduced so as to form an image 14 having a desired width on the screen (F).

Figure 2:
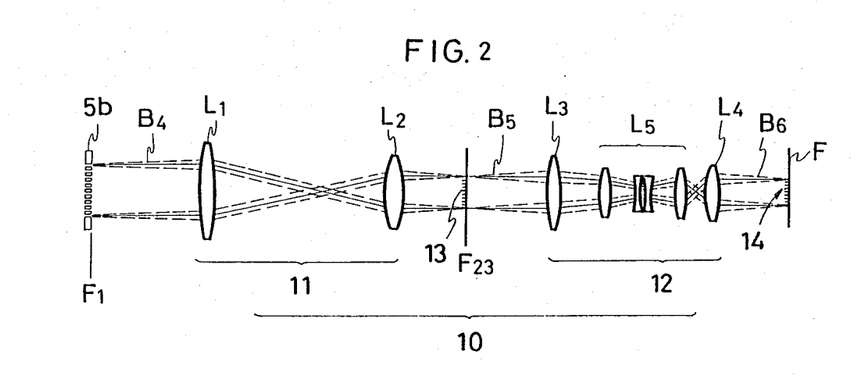
FIG. 2 is a diagrammatic plan view showing the image-forming optical system shown in FIG. 1(A)

FIG. 2 shows a diagrammatic view showing the optical system 10.

There are provided first and second lenses $L_1$ and $L_2$ in the first telescopic optical unit 11. In FIG. 1(B) the parallel laser beams $B_4$ from the beam shaping plate 5b situated at the forward focal position $F_1$ (FIG. 2) of the first lens $L_1$ are radiated from the second lens $L_2$ as an equal number of traces $B_5$, which form an image 13 at the backward focal position $F_{23}$ of the second lens $L_2$, wherein the image 13 has beam pitches reduced at the ratio $M_1$.

The second telescopic optical unit 12 also has first and second lenses $L_3$ and $L_4$, which also constitutes a telecentric optical entity. The parallel laser beams $B_5$ from the image 13 formed at the forward focal position (F) of the lens $L_3$ is radiated as an equal number of traces $B_6$ from the second lens $L_4$ so as to form an image 14 whose beam pitches are also reduced as desired.

The second telescopic optical unit 12 includes a zoom lens $L_5$ whereby the beam pitches of the image 14 may be steplessly adjusted.

Since the two telescopic optical units 11 and 12 are telecentrically connected, each reducing rate can be relatively small, thereby minimizing the possibilities aberrations. If only one optical unit is used, the reducing rate will be unavoidably large, which is likely to cause a large abberation. In the illustrated embodiment the reducing rate is steplessly adjustable in the range of 1/150 to 1/300.

Figure 3:
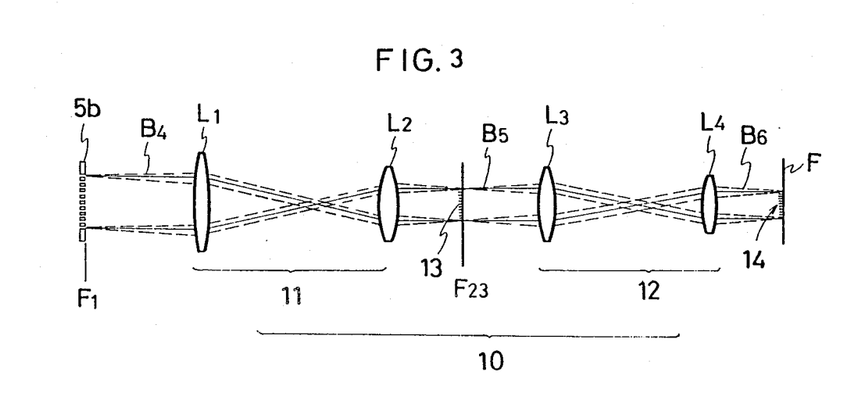
FIG. 3 is a diagrammatic plan view showing a modified version of the image-forming optical system shown in FIG. 1(A)

The use of the zoom lens $L_5$ is not limited to the second optical unit 12, and it can be used in the first optical unit 11. If there is no need to adjust the reducing rate steplessly it can be omitted as shown in FIG. 3.

Figure 6:
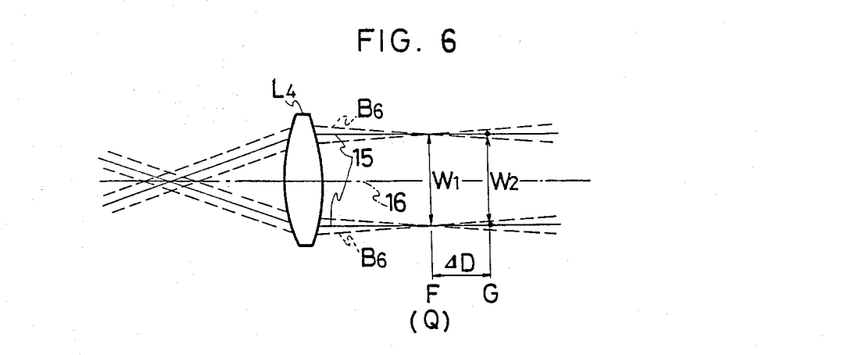
FIG. 6 is a diagrammatic plan view showing the mode of laser beams in the neighborhood of the image-forming screen in the optical system.

The advantage of the telecentric image-forming optical entity 10 is that in the case of a possible deviation $\Delta D$ occurring between the image-forming position (F) or (Q) and the recording position (G) as shown in FIG. 6 the dimensions of the images $W_1$ and $W_2$ on the respective positions are practically equal. In other words, the main optical trace 15 in each laser beam $B_6$ from the second lens $L_4$ is parallel to the optical axis 16 of the optical unit 12. The positional deviation is likely to make the image poor. To avoid this problem it is required to minimize the distance between the positions (F) and (G).

Figure 7:
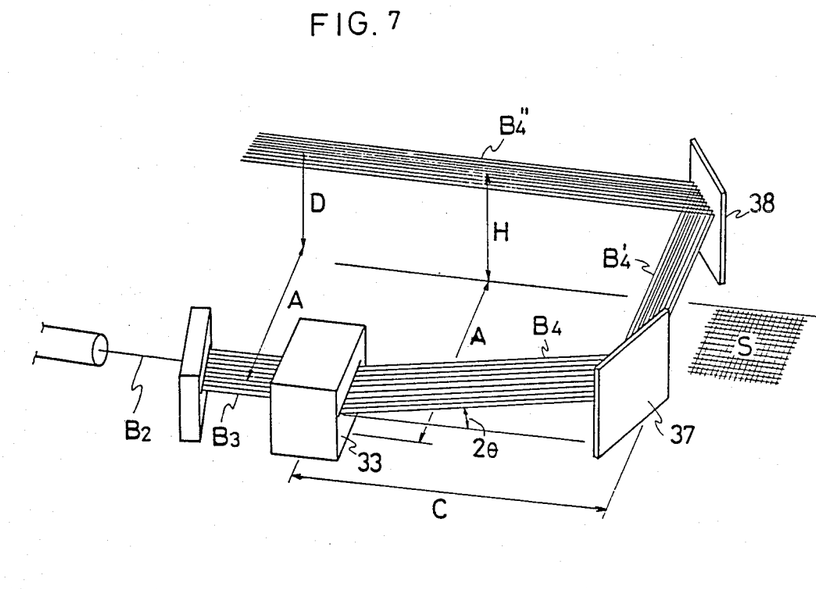
FIG. 7 is a diagrammatic perspective view showing the arrangement of reflecting mirrors.
Figure 8:
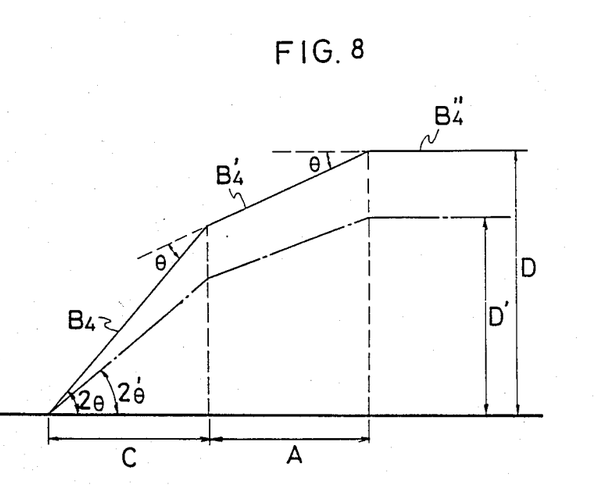
FIG. 8 is a graphic view exemplifying the angles taken by the laser beams shown in FIG. 7.

In such laser exposure devices a problem is that the multi-channel modulators of the same type may have different Bragg angles, thereby causing the row of the laser beams to incline with respect to the reference plans (S) as shown in FIG. 7. This would result in the laser beams $B_4''$ being non-parallel to the reference plane (S) and or at a distance from the reference plane other than the desired distance. However the laser exposure apparatus of the present invention can compensate for incline of the laser beams to the reference plane (S) in the following manner.

To ensure that the height of the laser beams $B_4''$ relative to the reference plane (S) is constant and that the laser beams $B_4''$ are parallel to the reference plane (S), the present invention adjusts the relative portions of modulator 33 and the mirrors 37 and 38. In FIG. 7, suppose that the distance between a multi-channel modulator 33 and the first mirror 37 is (C), the distance between the laser beams $B_3$ flush with the reference plane (S) and the laser beams $B_4''$ is (A), and the height of the laser beams $B_4''$ flush with the recording plane above the laser beams $B_3$ is (D), the relationship between the distances (A), (C) and height (D) and the Bragg angle $\theta$ can be approximately expressed by the following equation:

$$D = C \cdot 2\theta + A\theta \quad (1)$$
$$= (2C + A) \cdot \theta$$

wherein the angle $\theta$ (in radians) is extremely small.

The distance (C) can be determined by the following equation with each modulator:

$$C = \tfrac{1}{2}(D/\theta - A) \quad (2)$$

By adjusting the distance C as a function of the Bragg angle $\theta$, the incline is compensated for without varying the distances (A) and height (D).

According to the present invention the distance between the modulator 7 and the first mirror 9a, which corresponds to the distance (C) in FIG. 7, is adjusted in the following manner, wherein the "distance" means a distance from any selected trace of the laser beams or from an imaginary optical axis of the laser beams $B_4$.

First, the Bragg angle $\theta$ of the multi-channel optical modulator 7 is measured by means of a suitable measuring device. The measured value is introduced in the equation (2). Thus the value of the distance (C) is determined. Then each screw 58 (FIGS. 4A, 4B) is loosened so as to enable the base plate 50 to move until the distance between the modulator 7 and the first mirror 9a becomes equal to the calculated value. The base plate 50 is again fixed by fastening the screw 58.

The next step is that the angles of the first and second mirrors 9a, 9b are adjusted. It is adjusted to ensure that the incline $\theta$ of the laser beams $B_4$ relative to the laser beams $B_4''$ is equal to the incline $\theta$ of the laser beams $B_4''$ relative to the laser beams $B_4'$ as shown in FIG. 8.

In this way the laser beams $B_4''$ reflecting on the second mirror 9b are made parallel to the reference plane (S) with respect to the sub-scanning direction. As a result, the row of optical dots output by the image-forming optical system 10 is made to be parallel to the reference plane (S).

Figure 5:
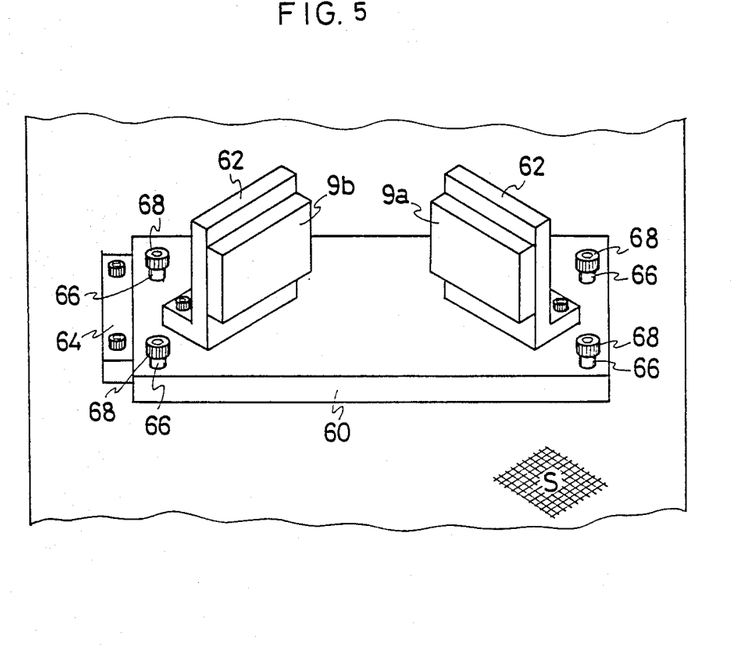
FIG. 5 is a perspective view showing another example of the embodiment according to the present invention.

Referring to FIG. 5 a modified version of the present invention will be described.

In this embodiment the first and second mirrors 9a and 9b are moved for adjustment instead of moving the modulator 7, that is, the two mirrors are synchronously moved in parallel with the laser beams $B_3$, thereby changing the distance (C) between the first mirror 9a and the modulator 7. In this embodiment the mirror 9a, 9b are adjustably fixed to the base plate 60 on the reference plane (S) by means of fasteners 62. The base plate 60 is guided by a slidable guide 64 in such a manner as to be slidable on the reference plane (S) in parallel with the laser beams $B_3$ split by the beam splitter 4. The reference numeral 66 denotess long holes produced in the base plate 60, and the reference numeral 68 denotes screws whereby the base plate 60 is fixed on the reference plane (S).

In the embodiments described above the image-forming optical system 10 includes two telescopic optical units 11 and 12 connected to each other and associated with a pair of mirrors. However, a single mirror or more than two mirrors can be effectively used provided that the system is a telecentric optical entity.

Instead of the slit 8 a plurality of apertures aligned in series can be used, or else a series of apertures can be provided in place between the image-forming optical system and the multi-channel optical modulator. In either case the apertures can make a slit-like long opening all together.

According to the present invention no change in size occurs in the recorded images even if any deviation occurs between the image-forming plane and the recording plane. This will be of particular advantage when the thickness of the photosensitive sheet varies, wherein it is only necessary to adjust the focus. There is no worry about a possible change in the size of the images to be recorded, thereby enabling the operator to concentrate on the operation of the apparatus.

Another advantage is that even if an error occurs in the Bragg angle of the modulator, and if an incline occurs in the rows of laser beams, the images can be scanned and recorded wtih accuracy because of the fact that the traces of laser beams are parallel to the reference plane (S) with respect to the subscanning direction of the image recording apparatus. In this way the images are scanned and recorded with a degree of high fidelity.

When variations in the incline of the rows of laser beams are compensated, for the positions of laser beams output by the laser exposure apparatus are kept constant, thereby fixing the recording basis.

In compensating a possible incline of the laser beams it is not necessary to move the image-forming optical system, thereby simplifying the operation. If it were otherwise the positional adjustment of the image-forming optical entity would be a labor- and time-consuming work.

What is claimed is:

1. A laser exposure apparatus for use in scanning and recording images, the apparatus comprising:
    a source of laser beam;
    means for expanding the diameter of a laser beam emitted from the source;
    a laser beam splitter for subdividing the laser beam into a plurality of laser beams propagating along parallel paths;
    a beam shaping plate disposed either immediately before or after the beam splitter and effective for acting on the laser beams passing therethrough such as to cause the same to have a relatively constant distribution of optical intensity;
    a multi-channel optical modulator for modulating the laser beams individually in response to image signals applied thereto; and
    an image-forming optical system for focusing an image formed by the laser beams onto a recording plane in a reduced scale, the image-forming optical system comprising a telecentric optical unit, thereby ensuring that the principal ray of each laser beam is parallel to the optical axis of the optical system.

2. An apparatus as defined in claim 1, wherein the telecentric optical unit includes a zoom lens.

3. An apparatus as defined in claim 1 or 2, wherein the location of the multi-channel optical modulator is adjustable along a direction which is parallel to the direction of the propagation of the laser beams received therein.

4. An apparatus as defined in claim 1 or 2, wherein the image-forming optical system includes two or more telecentric optical units, which are disposed in series along the optical axis of the optical system.

* * * * *